US00RE39153E

(19) United States
(12) Reissued Patent
Perino et al.

(10) Patent Number: US RE39,153 E
(45) Date of Reissued Patent: Jul. 4, 2006

(54) CONNECTOR WITH INTEGRAL TRANSMISSION LINE BUS

(75) Inventors: Donald V. Perino, N. Potomac, MD (US); James A. Gasbarro, Pittsburgh, PA (US); John B. Dillon, deceased, late of Washington, VA (US); by Nancy David Dillon, legal representative, Palo Alto, CA (US)

(73) Assignee: Rambus Inc., Los Altos, CA (US)

(21) Appl. No.: 09/871,313

(22) Filed: May 31, 2001

Related U.S. Patent Documents

Reissue of:
(64) Patent No.: 5,908,333
Issued: Jun. 1, 1999
Appl. No.: 08/897,788
Filed: Jul. 21, 1997

(51) Int. Cl.
*H01R 9/00* (2006.01)

(52) U.S. Cl. ..... 439/631; 361/775; 174/72 B
(58) Field of Classification Search ..... 439/61, 439/63; 361/785, 775, 788; 174/71 B, 72 B, 174/88 B
See application file for complete search history.

(56) References Cited

U.S. PATENT DOCUMENTS 2,904,768 A * 9/1959 Rasmussen ..... 439/631
3,085,177 A * 4/1963 Thompson ..... 439/593
3,368,117 A * 2/1968 Pond et al. ..... 361/775
3,399,372 A * 8/1968 Uberbacher ..... 439/60
3,491,267 A * 1/1970 Goshorn
3,567,999 A * 3/1971 Larson et al. ..... 361/775
4,241,381 A * 12/1980 Cobaugh et al. ..... 439/61
4,536,826 A * 8/1985 Ahiskali ..... 361/775
4,616,893 A * 10/1986 Feldman ..... 439/83
4,867,696 A * 9/1989 Demler, Jr. et al. ..... 174/72 B
5,104,324 A * 4/1992 Grabbe et al. ..... 439/62
5,329,424 A * 7/1994 Patel ..... 361/715

OTHER PUBLICATIONS

Dillon, et al. "Rambus Channel Design Guide," Copyright Rambus Inc., California, pp. ii–65, (1994).

* cited by examiner

*Primary Examiner*—Neil Abrams
(74) *Attorney, Agent, or Firm*—Vierra Magen Marcus Harmon & DeNiro LLP

(57) ABSTRACT

A socket (14) includes a first bus conductor (22a) having two or more contact regions (24) and a second bus conductor (22b) arranged substantially parallel to the first bus conductor and having two or more contact regions (24). The first and second bus conductors are spaced relative to one another so as to provide a predetermined electrical impedance and may be arranged to carry electrical signals as transmission lines. A dielectric spacer (36) may be disposed between the first and second bus conductors to provide the spacing. Contact regions (24) of the first and second conductors (22a, 22b) may provide compliant coupling regions for the socket (14). The contact regions (24) of the first bus conductor (22a) may be positioned within the socket (14) so as to contact a lead disposed on a first side of a circuit element (16) and the contact regions (24) of the second bus conductor (22b) may be positioned within the socket (14) so as to contact the lead disposed on the second side of the circuit element (16).

57 Claims, 11 Drawing Sheets

CONNECTOR WITH INTEGRAL TRANSMISSION LINE BUS

Matter enclosed in heavy brackets [ ] appears in the original patent but forms no part of this reissue specification; matter printed in italics indicates the additions made by reissue.

FIELD OF THE INVENTION

The present invention relates to electrical interconnects and, in particular, connectors for use in high speed electrical interfaces.

BACKGROUND

In general, electrical connectors consist of two components, a receptacle and a plug. The receptacle is the compliant part of the connector. That is, the receptacle is fashioned in such a way that it provides compliance (or "springiness"), either through the use of a springy metal such as a Beryllium-Copper (Be—Cu) alloy or some other means. The plug then forms the non-compliant part of the connector.

Connectors are used in a variety of applications where electrical coupling between components, e.g., integrated circuits, circuit boards, etc., is desired. However, connectors for high speed interfaces are required to present controlled impedance interconnections. The interface between a Rambus DRAM (RDRAM®) and a Rambus Channel is an example of a high speed interface that requires a connector having particular electrical and physical characteristics.

Since the early 1970s, the essential characteristics of a DRAM interface have remained as a separate data bus and a multiplexed address bus. However, a recent architecture pioneered by Rambus, Inc. provides a new, high bandwidth DRAM interface. Originally, the Rambus Channel, the heart of the new DRAM interface, comprised a byte wide, 500 or 533 Mbytes/sec. bi-directional bus connecting a memory controller with a collection of RDRAMs®. Among the many innovative features of the Rambus Channel and of the RDRAM® is the use of vertically or horizontally mounted RDRAMs® and a physically constrained, bi-directional bus using terminated surface-trace transmission lines on a circuit board. The physical and electrical properties of both the RDRAMs® and bus on which they are placed are rigidly defined because high frequency operation relies on the careful physical design of both the printed circuit board and the high speed components. Originally, RDRAMs® were specified to include a 32-pin package, either a surface horizontal package (SHP) or a surface vertical package (SVP).

Electrical connectors of the past have generally been unsuitable for use in high speed bus applications such as may be found with the Rambus Channel. For example, as shown in FIG. 1, electrical connectors of the past have employed compliant contact elements 2 to receive semiconductor devices and/or circuit boards to provide electrical coupling to a circuit on a substrate 4 (e.g., a motherboard). The electrical connectors may be contained within housings 6 adapted to receive the semiconductor device or circuit board and are electrically coupled to circuit elements on the motherboard through a solder connection 8. Such a connector thus requires a number of surface mount contacts (e.g., solder contacts 8) between the contact elements 2 and the substrate 4.

Such a connector is not suitable for use in a high speed electrical bus because the contact elements 2 are individually soldered to circuit elements (e.g., electrical traces) on the substrate 4, and because the resulting solder joints 8 are generally not accessible for inspection and repair. High speed bus design dictates that the electrical signal path from device to device be kept at a minimum. Further, electrical contacts on each device should be concentrated into a small area. Together, these requirements lead to a high density area array of separable contacts, whose corresponding solder joints are made inaccessible due to interference from adjacent contacts and/or the contact housing. Except for special "ball grid array" soldering techniques, surface mount solder joints are generally required to be accessible for inspection and repair. Because connectors such as that illustrated in FIG. 1 are incapable of meeting these requirements, they are unsuitable for use in high speed bus applications.

SUMMARY OF THE INVENTION

It is an object of the present invention to provide means for electrically coupling a number of substantially similar electrical devices in a substantially bus-like arrangement.

It is a further object of the present invention to provide an electrical connector for use in high speed applications.

A socket is described. The socket may include a first conductor having two or more contact regions and a second conductor arranged substantially parallel to the first conductor and having two or more contact regions. The first and second conductors are spaced relative to one another so as to provide a predetermined electrical impedance. A dielectric spacer may be disposed between the first and second conductors to provide the spacing. Contact regions of the first and second conductors may provide compliant coupling regions for the socket. The first conductor may be further adapted to be coupled to a substrate through only two electrical contact elements over its length, regardless of the number of contact regions of the first conductor. In addition, the second conductor may be further adapted to be coupled to the substrate through a number of electrical contact elements disposed along its length, the number of contact elements being independent of the number of contact regions of the second conductor.

Further described is an electrical connector that includes a socket and a number of conductors disposed therein. The conductors are arranged to carry electrical signals as transmission lines, and are further arranged into a first group of conductors, each adapted to be coupled to a substrate at only two electrical contact elements, and a second group of conductors each adapted to be coupled to the substrate at a plurality of electrical contact elements. The conductors may each include compliant contact regions, each arranged such that the contact regions of a first of the conductors are positioned within the socket so as to contact a lead disposed on a first side of a circuit element and the contact regions of a second of the conductors are positioned within the socket so as to contact a lead disposed on a second side of the circuit element. A dielectric spacer may be disposed between the first and second conductors.

Also described is a circuit board that includes a compliant electrical connector having a plurality of conductors arranged into a first group of conductors each adapted to be coupled to a substrate at only two electrical contact elements and a second group of conductors each adapted to be coupled to the substrate at a plurality of electrical contact elements. The circuit board further includes an electrical channel, which may include a number of traces, coupled to the connector. Each of the electrical conductors may further include two or more contact regions, the number of contact regions of each conductor being independent of the number of electrical contact elements of a respective conductor.

In addition, a connector that includes a first electrical signal path configured to provide a bus-like interconnection between similar electrical couplings of two or more electrical components, the bus-like interconnection adapted to be isolated from a circuit board except for two electrical contact elements disposed near opposite ends of said first electrical signal path; the connector also including a ground signal path, is described. The ground signal path may be configured as a second electrical signal path arranged to provide a bus-like interconnection between similar electrical couplings of said two or more electrical components. Further, the ground signal path may be adapted to be electrically coupled to a ground plane of the circuit board at a plurality of points along said bus-like interconnection. The first electrical signal path generally includes an electrical conductor having compliant contact regions, which may include elastomer-backed metal regions or may be made of a Beryllium-Copper (Be—Cu) alloy.

Additionally described is a socket that includes a conductive signal bar having two or more contact regions, each adapted to couple to a contact region on a respective electrical device, the signal bar further adapted to be electrically coupled to a circuit board through only two electrical contact elements regardless of the number of contact regions of said signal bar. The socket also includes a conductive ground bar arranged substantially parallel to said signal bar and having two or more contact regions, each adapted to couple to a contact region on said respective electrical devices, and further being adapted to be electrically coupled to a conductive reference region of the circuit board at a number of electrical contact elements, the number of electrical contact elements being independent of the number of contact regions of the ground bar.

BRIEF DESCRIPTION OF THE DRAWINGS

The present invention is illustrated by way of example, and not limitation, in the Figures of the accompanying drawings, in which.

DETAILED DESCRIPTION

Described herein is a socket which includes a first conductor having two or more contact regions and second conductor arranged substantially parallel to the first conductor and also having two or more contact regions. The first and second conductors are spaced relative to one another so as to provide a predetermined electrical impedance. For one embodiment, a dielectric spacer may be disposed between the first and second conductors to provide the spacing. Embodiments of the present invention may find particular use as a socket for accepting integrated circuit (IC) devices, e.g., memory devices such as RDRAMs®, or circuit boards which operate at high frequency. High frequency operation requires careful physical design and a robust electrical interface, both of which are provided by the present invention.

Because the Rambus channel operates at very high frequency with only limited voltage swings between logic levels, any new connector system requires not only a careful physical design but a robust electrical interface. Thus, embodiments of the present invention provide the physical and electrical properties needed to maintain signal integrity on the Rambus channel. At the same time, embodiments of the present invention provide a more manufacturable solution when compared with other means of coupling RDRAMs® to a printed circuit board. Of course, further embodiments of the present invention may also find application wherever a semiconductor device is to be coupled to a substrate (e.g., a motherboard) across a high speed electrical interface.

Figure 1:
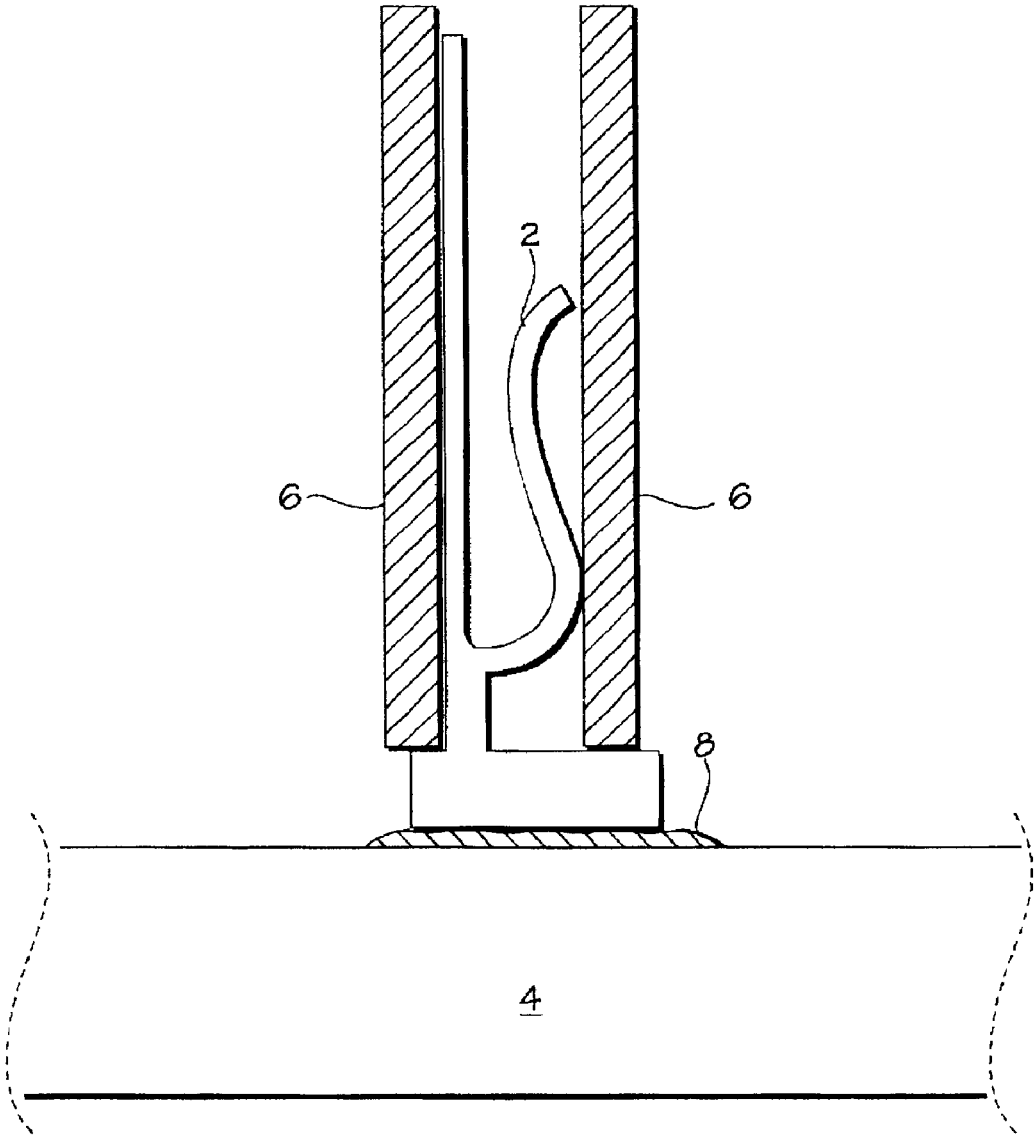
Fig. 1 (Prior Art)
FIG. 1 illustrates a conventional electrical connector requiring an independent surface mount contact.
Figure 2:
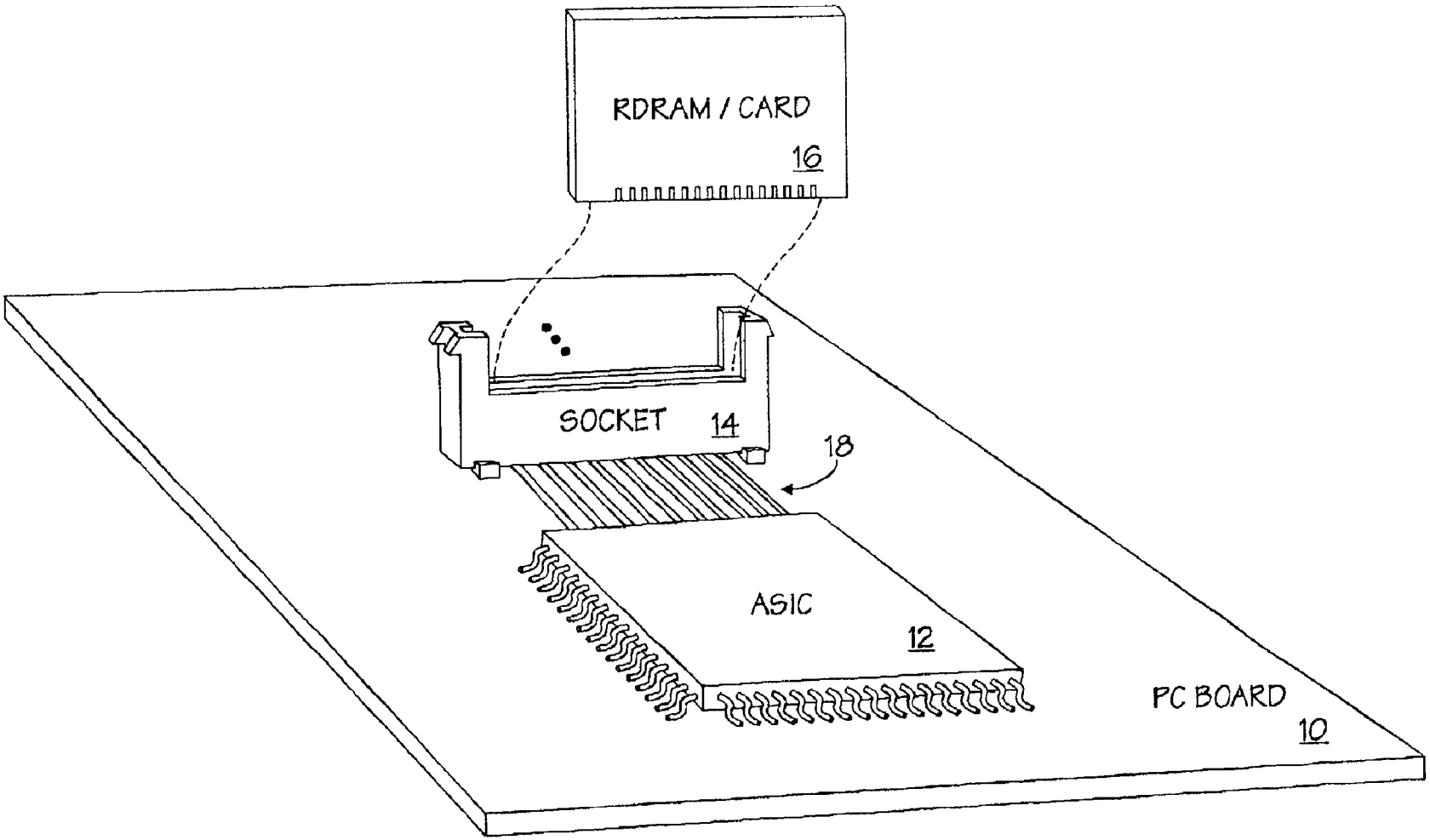
FIG. 2 illustrates a printed circuit board with a socket configured in accordance with one embodiment of the present invention.

As shown in FIG. 2, a printed circuit board (PC board) 10 may include an application specific integrated circuit (ASIC) or other processing device 12. ASIC 12 may be mounted to PC board 10 using any of number of conventional integrated circuit mounting techniques. For some embodiments, ASIC 12 may be soldered directly to traces on PC board 10. Also mechanically affixed to PC board 10 is a socket 14 configured in accordance with one embodiment of the present invention. Socket 14 may be adapted to accept an RDRAM® or other Daughter card 16. Socket 14, in addition to providing a mechanical coupling for Daughter card 16, provides a electrical interface between Daughter card 16 and channel 18. Channel 18 includes a number of metal traces laid out on printed circuit board 10 using conventional printed circuit board fabrication techniques and may be configured in accordance with the Rambus Channel physical and/or electrical specifications or other high speed electrical interface requirements.

In general, printed circuit board 10 may include a number of sockets 14. Each socket 14 may be adapted to accommodate two or more Daughter cards 16. Within each socket 14, means of electrically coupling a number of Daughter cards 16 in a substantially bus-like arrangement are provided. In this context, coupling means that there is a separable electrical contact between each Daughter card 16 and the bus. The term bus, as used herein, refers to the interconnect being such that each device (i.e., each Daughter card 16) has an identical (or nearly identical) pinout layout and substantially similar physical dimensions. For example, socket 14 is configured so that each pin "n" of each device contained within socket 14 is connected together. There may be additional electrical connections other than the bus connections, however, the remainder of this description will be directed to the bus-like connections within socket 14.

It is important to recognize that the bus within socket 14 operates at high frequency. That is, the edge rate of the signals present on the electrical connections is comparable to the propagation delay along at least one of the possible signal paths. In general, these connections are referred to as transmission lines.

Proper signaling on transmission lines depends on proper termination, which is commonly performed with resistors. The resistors are selected to have values which match the characteristic impedance of the transmission lines. Therefore, it becomes necessary for the bus to have a known impedance. Accordingly, the electrical conductors which make up the bus-like connection for socket 14 provide a predetermined electrical impedance.

The bus impedance is, in general, determined by the "unloaded" impedance (i.e., the impedance when no Daughter cards 16 are present) as well as the effect of device loading. In general, all of the relevant pin connections of each of the devices to be inserted in socket 14 have substantially similar loading effects (typically this may be primarily input capacitance). Therefore, the remaining parameter to be controlled is the "unloaded" impedance of the bus connector mechanism. As discussed further below, it is this impedance which is the predetermined impedance provided by the electrical coupling means within socket 14.

Figure 3A:
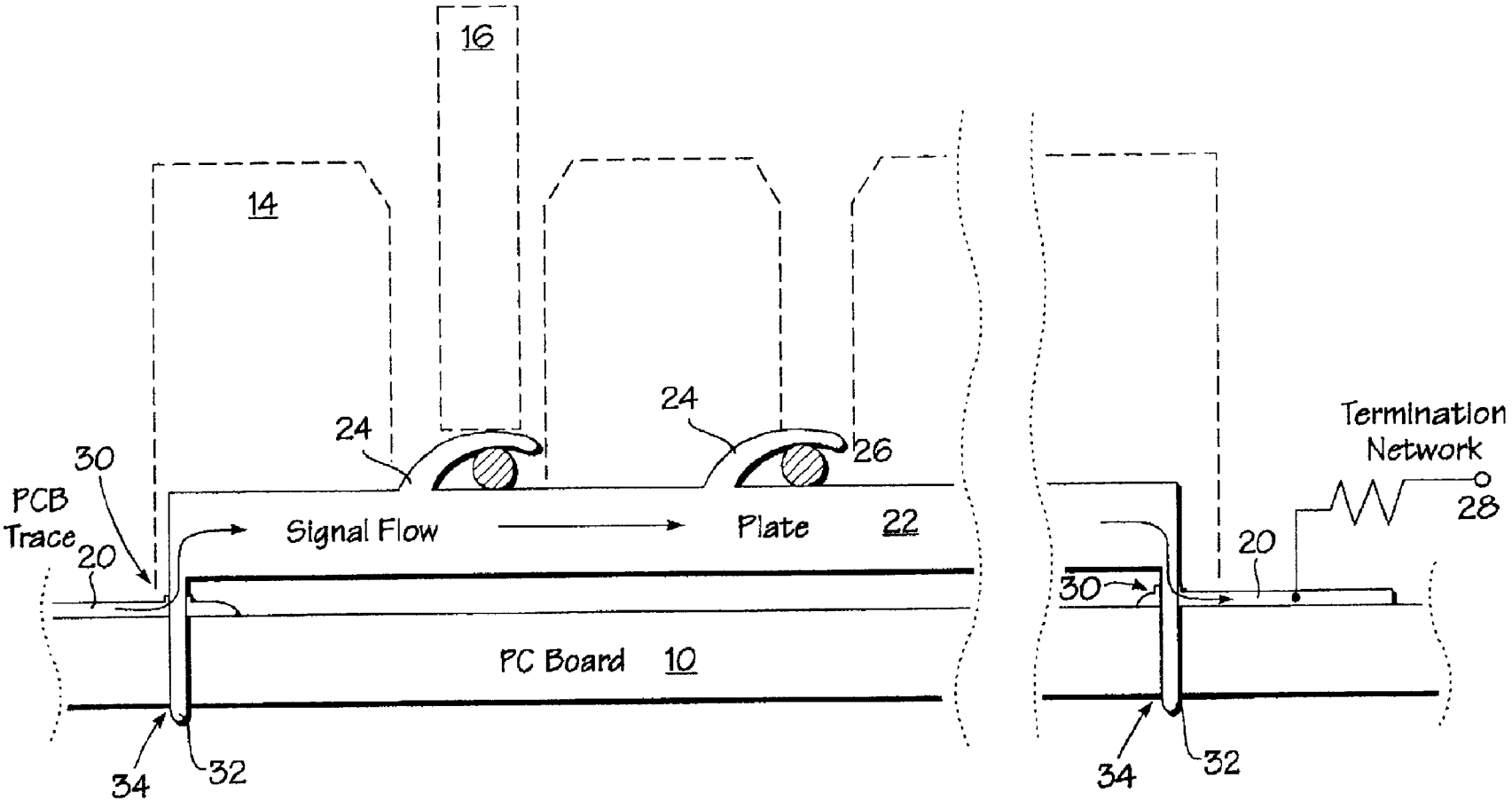
FIG. 3A illustrates a cross-sectional view of the printed circuit board shown in FIG. 1 and includes features of the socket shown in FIG. 1 according to one embodiment of the present invention.

FIG. 3A illustrates a cross sectional view of printed circuit board 10. Socket 14 is illustrated in dotted outline as is a Daughter card 16. Notice that Daughter card 16 is accommodated in slots within socket 14. The slots provide mechanical coupling and/or support for Daughter card 16 although in other embodiments other mechanical coupling and/or support means may be used. Along printed circuit board 10 is a metal trace 20. Trace 20 forms part of channel 18.

Within socket 14 is a plate 22. Plate 22 is made of metal and is used as a signal conductor for electrical signals transmitted between ASIC 12 and Daughter card 16 along trace 20 of channel 18. As shown, plate 22 includes a number of contact regions 24, contact regions 24 provide an electrical coupling between the associated contact regions where pins of Daughter card 16 and plate 22 touch. In this way, an electrical (i.e., signal) connection is provided from ASIC 12, along trace 20, to plate 22 and contact region 24 to Daughter card 16.

Also provided within socket 14 is an elastomer 26 which is disposed underneath contact region 24. Elastomer 26 provides compliance so that irregularities in plate 22 and/or Daughter card 16 are accounted for. That is, the elastomer 26 provides a springiness so that when Daughter card 16 is inserted in socket 14, contact regions 24 are not broken (e.g., as may occur if the contact regions 24 and/or the plates 22 are fabricated from a relatively stiff material such as a Phosphor-Bronze alloy). In addition, the springiness provided by elastomer 26 helps to support contact regions 24 against corresponding contact regions or pins on Daughter card 16 to maintain a good electrical connection. In this way, proper electrical coupling is provided. Preferably, elastomer 26 is fabricated from a dielectric material so that proper electrical isolation is maintained if a single elastomer 26 runs through more than one contact region/plate junction.

The multiple contact regions 24 of plate 22 will allow coupling between similar pins of similar Daughter card 16. In this way, the bus-like architecture described above is achieved. A termination network 28 may be provided at the end of the bus for impedance matching.

Plate 22 may be electrically coupled to trace 20 though soldered connections 30 which form electrical contact elements. Other electrical coupling means may also be used. Plate 22 may have one or more associated posts 32 which may fit into associated holes 34 in PC board 10. In this way, mechanical stability for plate 22 is provided. Plate 22 has only two electrical contact elements (e.g., solder connections 30) to couple to PC board 10 regardless of the number of contact regions 24 disposed along its length. The contact elements may correspond to posts 32 or may be other contact elements.

Preferably, plates such as plate 22 which are signal (and not ground) conductors are electrically coupled to metal traces 20 only at the ends of plate 22. This is important so that only plate 22 acts as a signal carrying bus through socket 14. The reason for isolating the signal carrying buses from the PC board 10 in this fashion is to ensure that the impedance of the signal carrying bus with respect to the ground busses is determinable. If the signal carrying busses were soldered to the printed circuit board at various points throughout the length of the bus (e.g., plate 22) there would be no guarantee that all the solder connections were made or that the connections were fabricated in the same fashion and so the impedance of the signal bus could not be determined with high accuracy.

In contrast, where plates 22 are used as ground (and not signal) conductors, the plates 22 are preferably "stitched" or redundantly connected (e.g., by solder connections) to the ground system of the printed circuit board 10 by means of electrical contacts at variety of intervals along the length of the plate 22. For example, for a plate 22 which is used as a ground bus bar, the plate may have a number of metal posts 32 at regularly spaced intervals along its length, each being soldered to a ground trace or other reference plane on PC board 10. Thus, the signal bus bars and the ground bus bars (each of which may be fabricated as metal plates 22) are physical opposites in that the signal bus bars are isolated from the printed circuit board 10 over their signal carrying lengths while the ground bus bars are intimately connected to the printed circuit board 10 reference plane over their lengths.

Figure 3B:
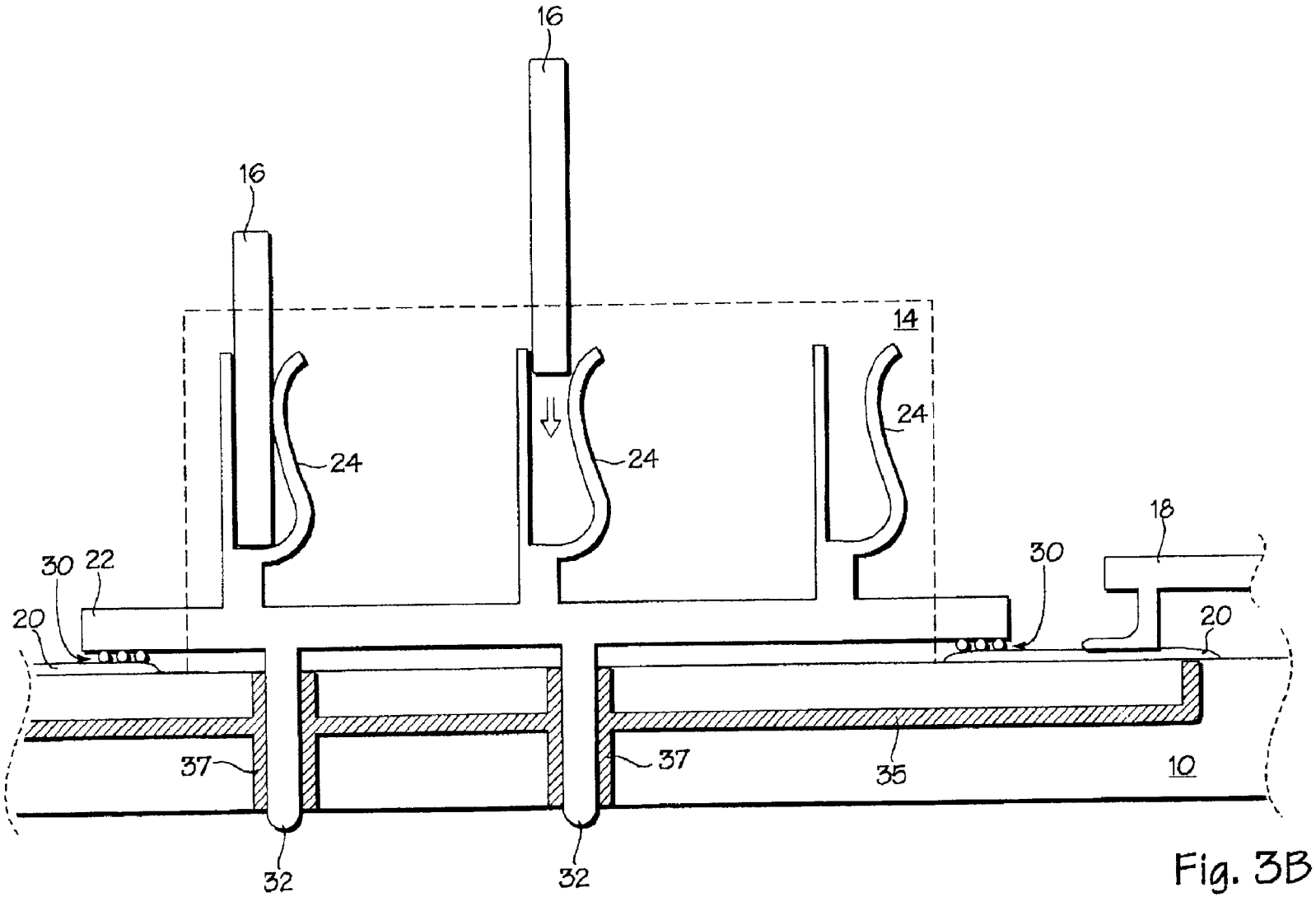
FIG. 3B illustrates a cross-sectional view of a bus conductor adapted to carry a ground signal in accordance with an embodiment of the present invention.

FIG. 3B illustrates the ground contact design described above. A plate 22 which is adapted to carry an electrical ground within socket 14 (shown in dotted outline) has electrical contact elements, e.g., solder connections 30, at either end and also has several posts 32 which act as further electrical contact elements coupled to a ground plane 35 at corresponding thru-hole connections 37 along the length of plate 22. The thru-hole connections 37 provide additional protection against excessive ground bounce and further provide mechanical stability for plate 22. Note that the number of electrical connections between plate 22 and ground plane 35 depends only on the number of electrical contact elements, such as solder connections 30 and thru-hole connections 37, and not on the number of contact regions 24 disposed along the length of plate 22. Notice also that, for this embodiment, contact regions 24 provide mechanical support for Daughter cards 16 in place of (or in addition to) slots in socket 14.

Figure 4:
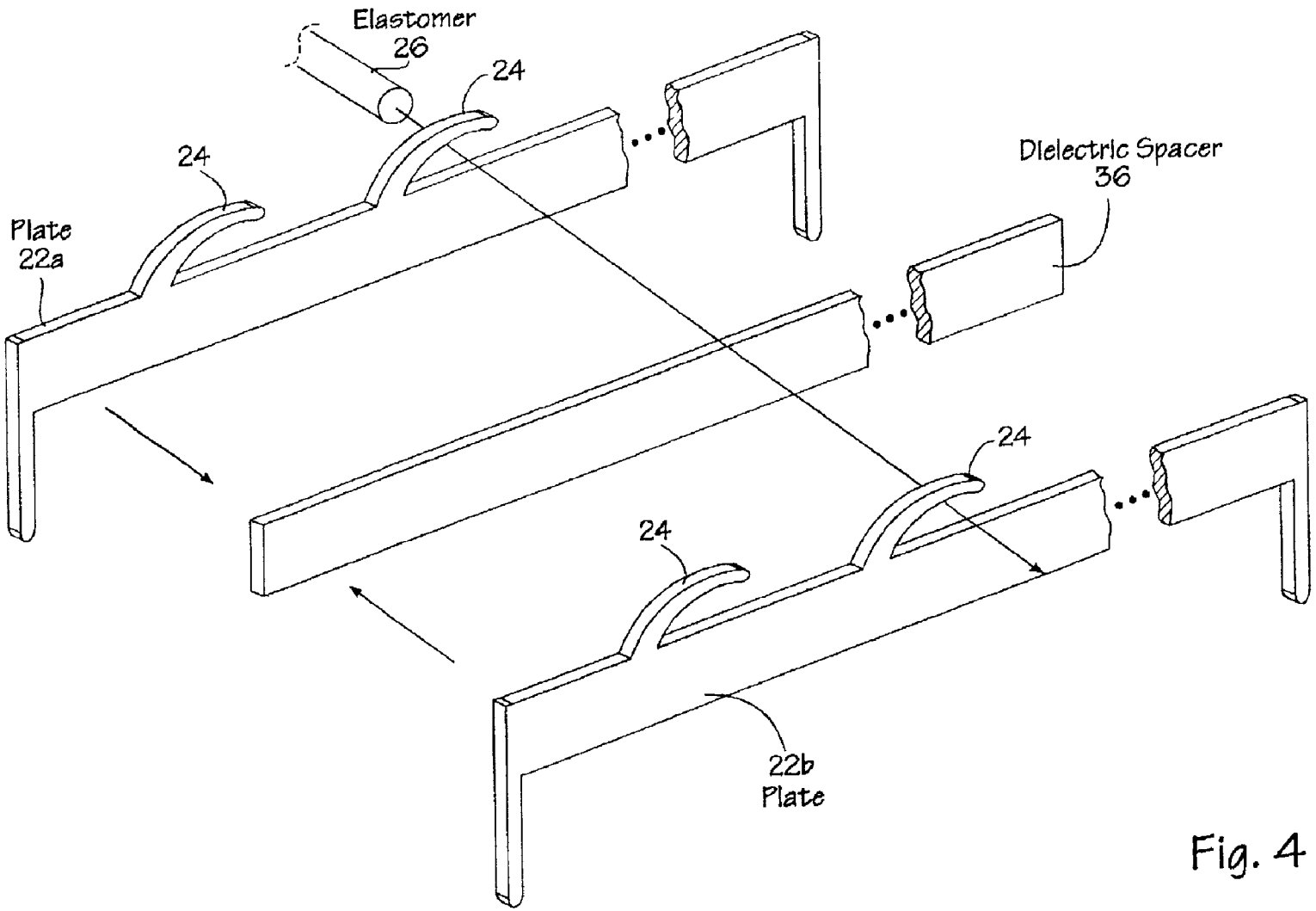
FIG. 4 illustrates one means of providing a desired spacing for electrical conductors within a socket according to one embodiment of the present invention.

A number of plates 22, disposed substantially parallel to one another, will be provided within socket 14 to connect like pins of various Daughter cards 16. The spacing of plates 22 is controlled so as to provide the required unloaded electrical impedance to ensure proper operation at high frequency. FIG. 4 illustrates in more detail one means of providing the proper spacing and electrical coupling between plates. As shown, a first plate 22a and second plate 22b may be separated by a dielectric spacer 36. Each of the plates 22a and 22b may be bonded to the dielectric spacer 36 and pressed together so as to achieve the desired spacing between elements. Elastomer 26 is provided between contact regions 24 and the remainder of the plate 26 to provide compliance as described above. In other embodiments, the electrical properties provided by dielectric spacer 36 may be achieved by using an air gap between plates 22a and 22b.

Figure 5:
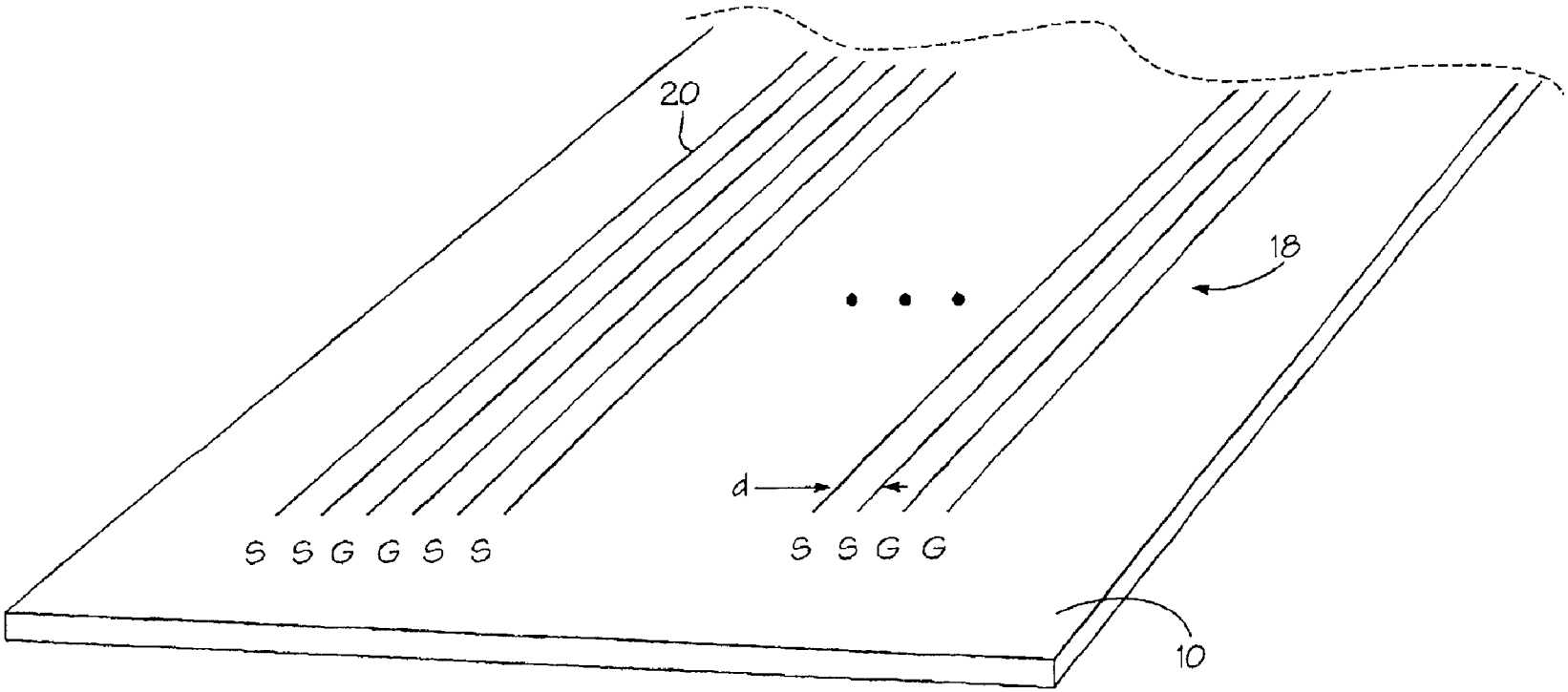
FIG. 5 illustrates an electrical channel according to a further embodiment of the present invention.

In order to provide proper signal integrity, channel 18 and, hence, plates 22 within socket 14, is/are organized so that cross-talk between signal lines is reduced or eliminated. This may be achieved, in one embodiment, as illustrated in FIG. 5. As shown, the traces 20 on printed circuit board 10 which make up channel 18 are arranged in pairs of signal lines (S) and ground (AC) lines (G). That is, the traces 20 are arranged as signal, signal; ground, ground; signal, signal, etc. and are spaced at a desired distance "d" to achieve desired electrical characteristics (e.g., a desired impedance). The conductors within socket 14 carry the respective signals or grounds from channel 18.

Figure 6A:
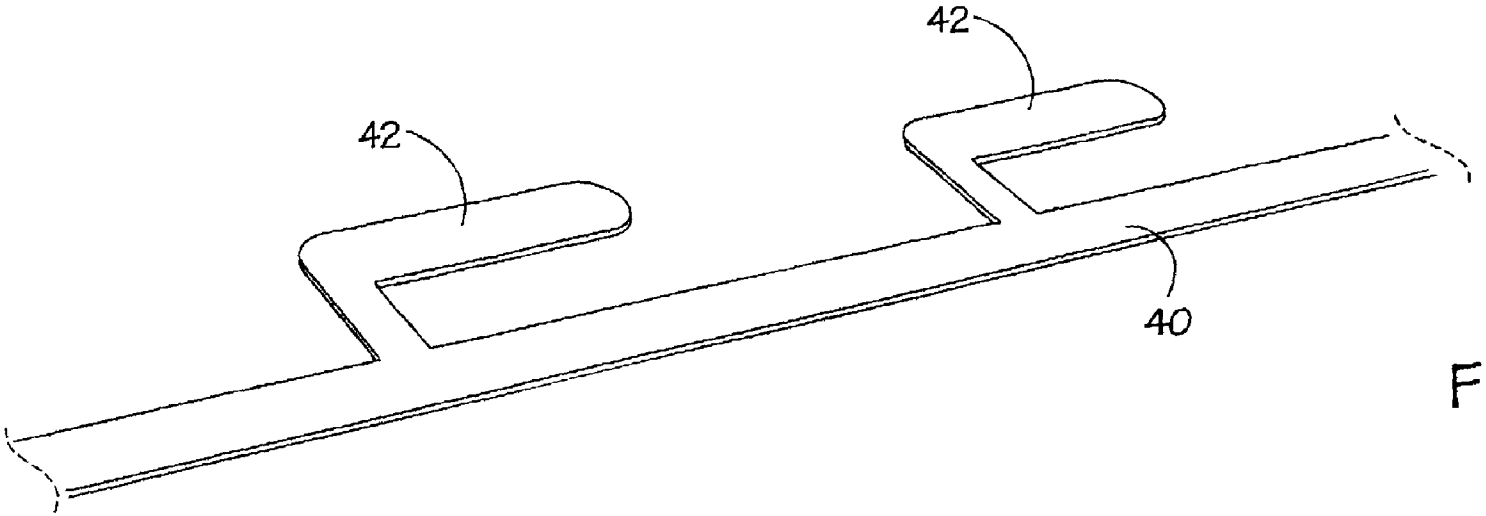
FIG. 6A illustrates an alternative conductor with contact regions for use according to a further embodiment of the present invention.
Figure 6B:
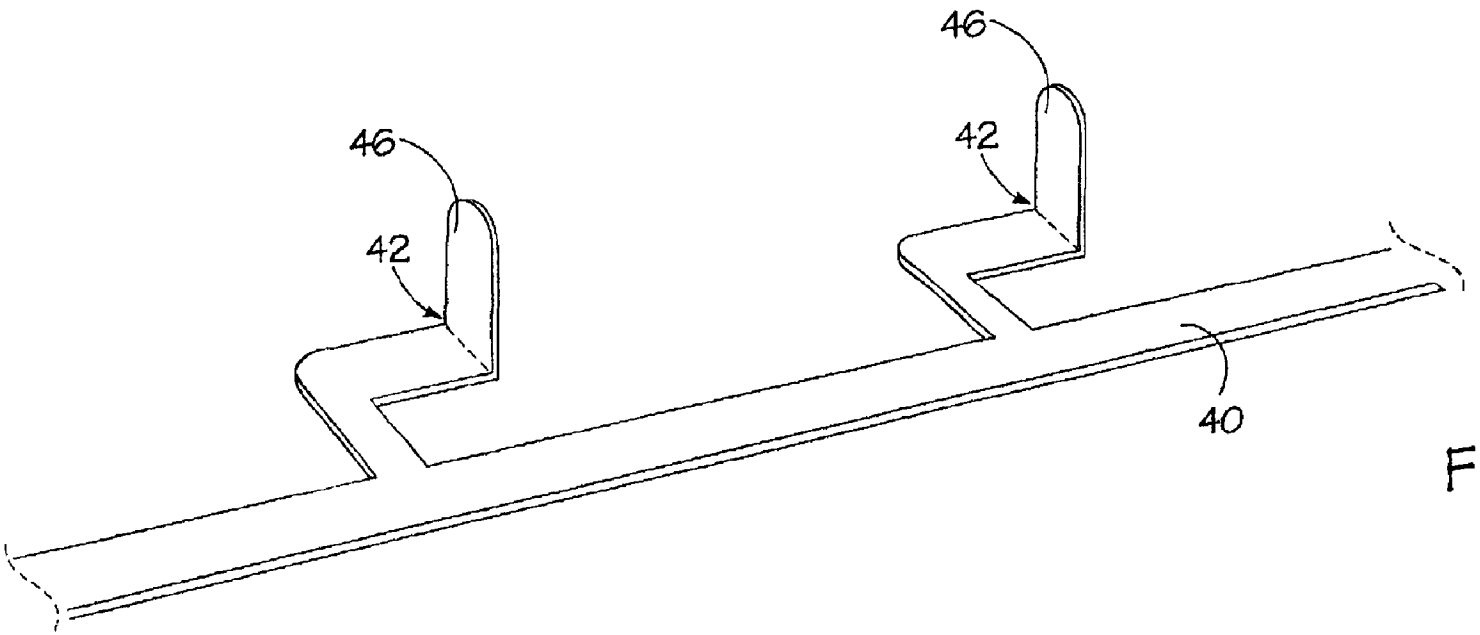
FIG. 6B illustrates the conductor of FIG. 5A with contact regions bent to provide desired electrical characteristics in accordance with a further embodiment of the present invention.

FIG. 6A illustrates an alternative embodiment for the electrical conductors within socket 14. En this case, plates 22 have been replaced with conductors 40. Conductors 40 include contact regions 42 which are formed as taps or fingers. In general, conductors 40 may be stamped from metal and may lie flat along the bottom of socket 14. Appropriate electrical connection between traces 20 and conductors 40 is provided (e.g., using a solder connection). As shown in FIG. 6B, contact regions 42 are bent so as to form contact pads 46. Contact pads 46 may then provide electrical coupling between corresponding contact regions or pins on Daughter card 16 and conductor 40.

Figure 7:
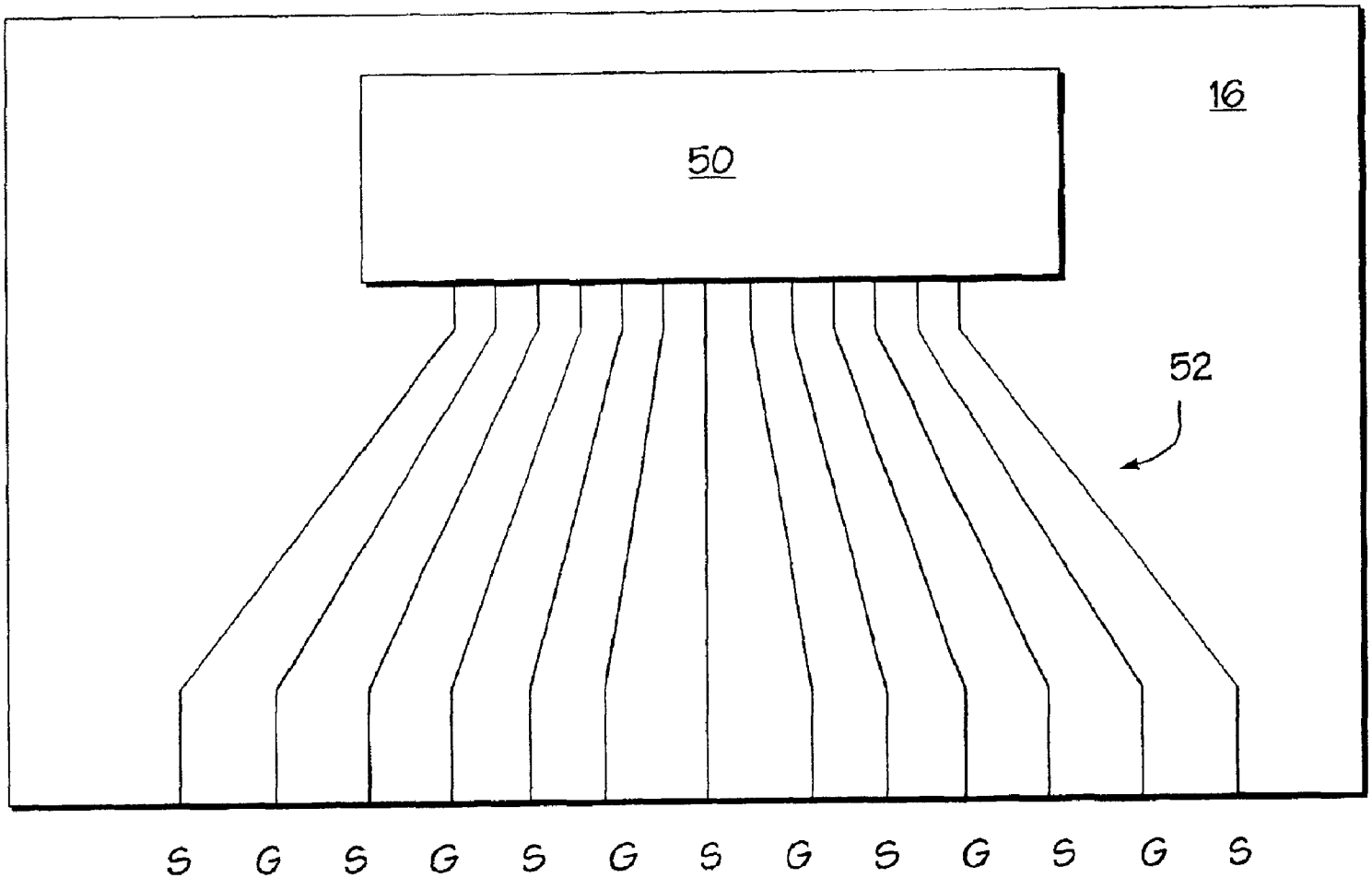
FIG. 7 illustrates one embodiment of a Daughter card for use with a socket configured according to one embodiment of the present invention.

FIG. 7 illustrates in more detail a Daughter card 16. As shown, Daughter card 16 comprises an integrated circuit (IC) component 50, for example a DRAM chip, and a plurality of leads 52. Leads 52 extend from IC component 50 in a fan out pattern to one edge of Daughter card 16. The leads 52 may be metal traces on a suitable flexible material overlaid over a rigid support member, e.g., a metal plate. In general, leads 52 may be present on both sides of Daughter card 16 and may terminate in larger contact pads or pins.

Figure 8:
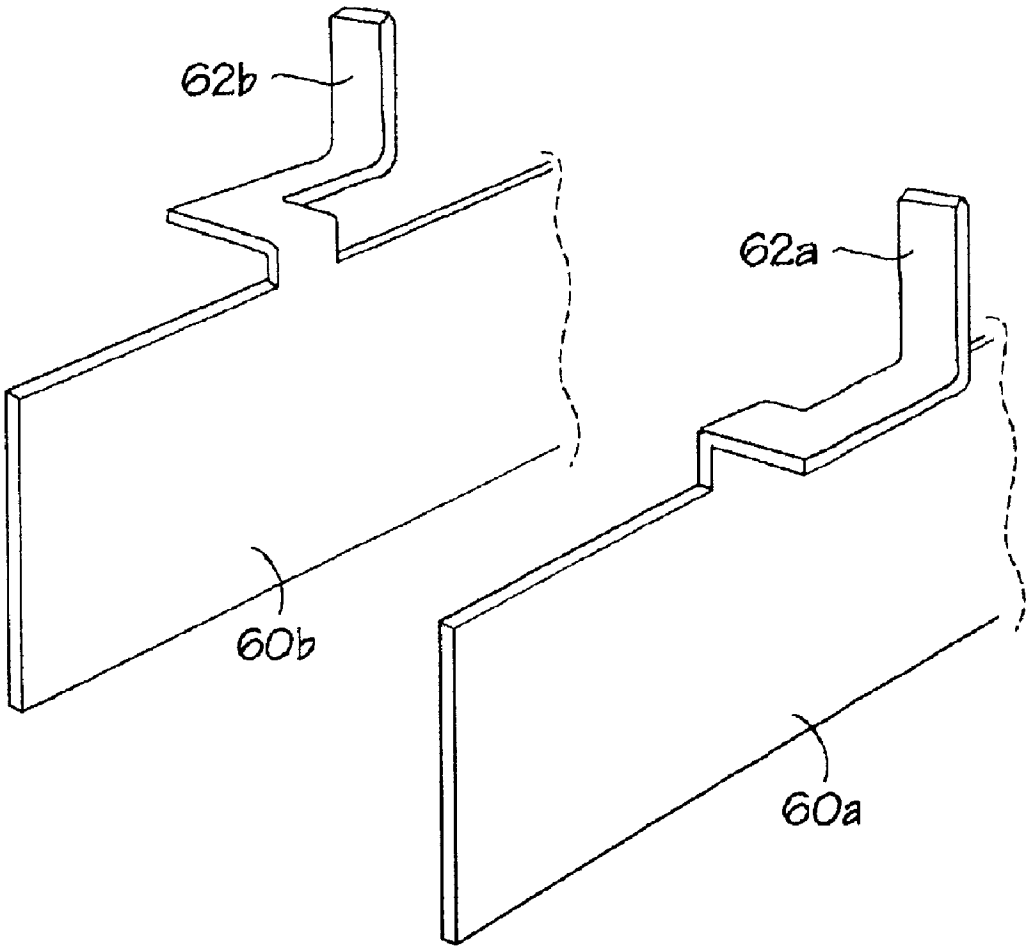
FIG. 8 illustrates a pair of conductors with contact regions arranged in accordance with an alternative embodiment invention.

For the situation where leads are present on both sides of Daughter card 16, an alternative electrical connection within socket 14 may be provided using conductors 60a and 60b as illustrated in FIG. 8. Conductors 60a and 60b may be formed as metal plates as for the embodiment illustrated in FIG. 3 or as essentially flat conductors as for the embodiment shown in FIG. 6A. Contact regions 62a and 62b are formed using tabs or fingers similar to the embodiment illustrated in FIGS. 6A and 6B. As shown, conductor 60a may used for a ground signal and conductor 60b may used as a signal carrying conductor, for example, where traces 20 (not shown) are arranged as signal, signal; ground, ground; etc. as discussed above.

Figure 9:
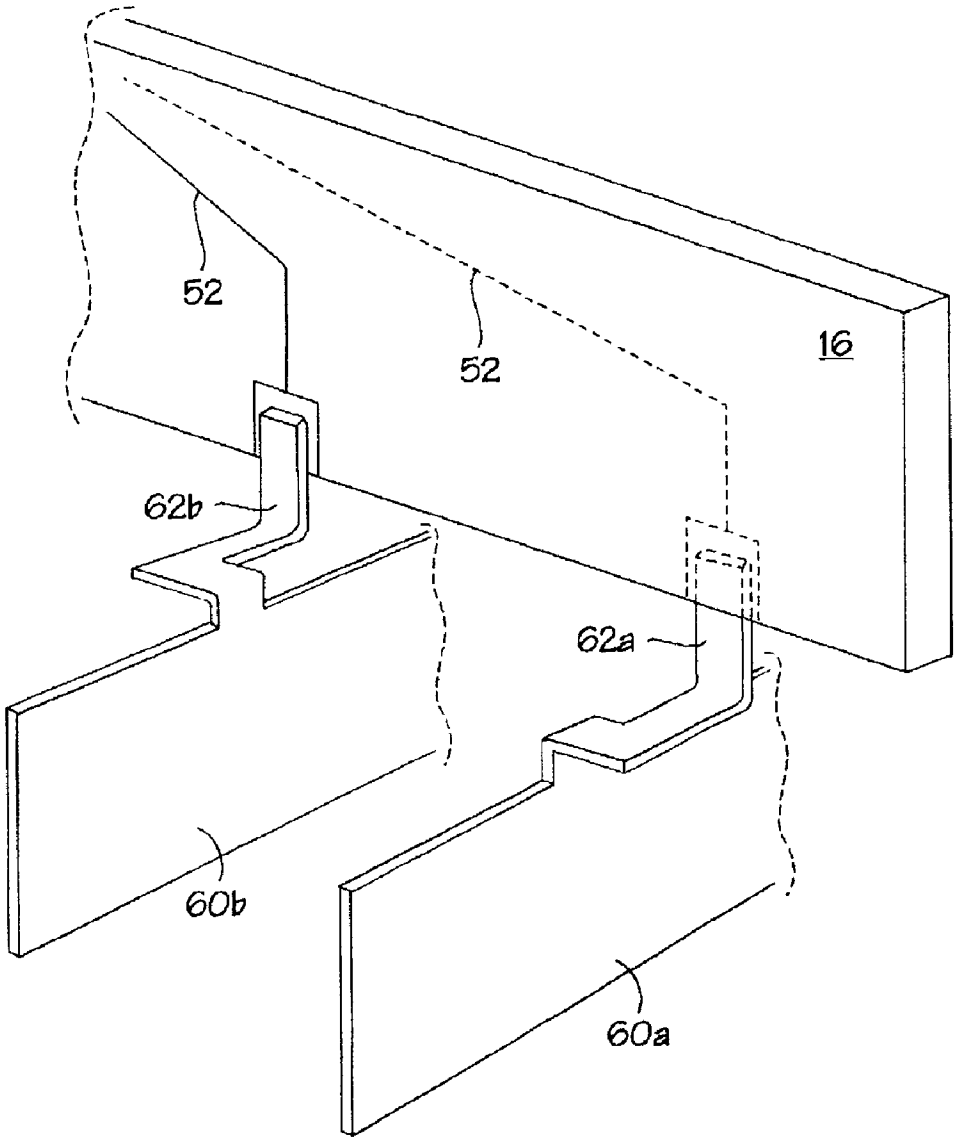
FIG. 9 illustrates how the conductors shown in FIG. 7 provide some mechanical support for an integrated circuit component in accordance with one embodiment of the present invention.

In one embodiment, conductors 60a and 60b may be disposed within socket 14 so that contact region 62a makes contact with a pin or lead on one side of Daughter card 16 while conductor 62b makes contact with a pin or lead (or other contact region) on the opposite side of Daughter card 16. This arrangement is illustrated in FIG. 9. Such an arrangement provides additional mechanical support for Daughter card 16 within socket 14.

Figure 10:
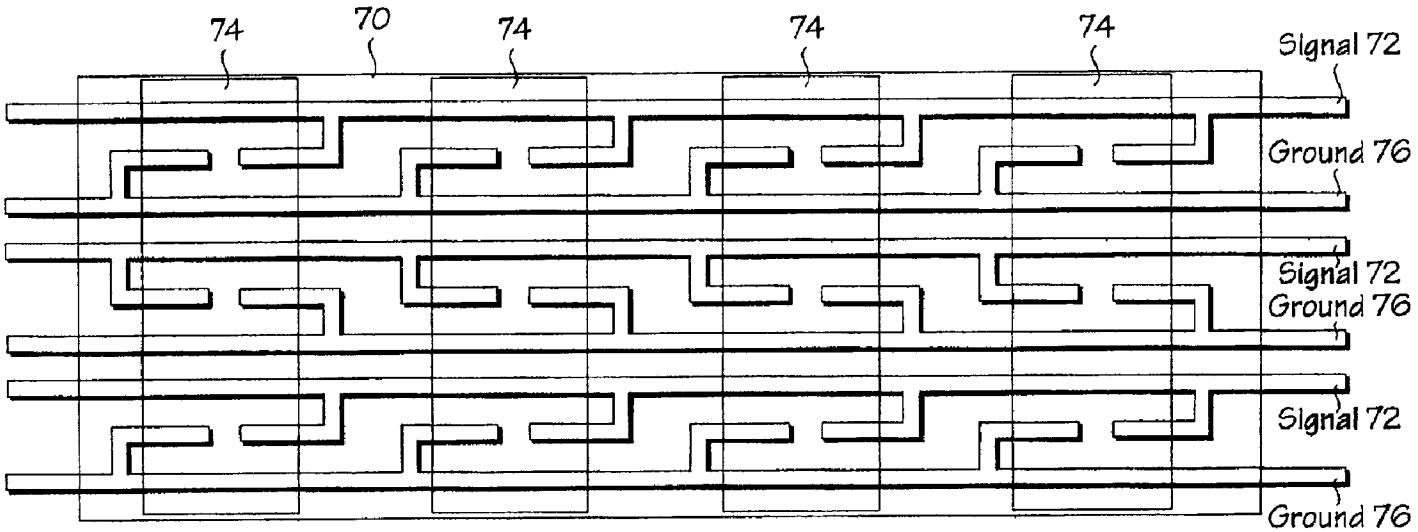
FIG. 10 illustrates a further embodiment of a transmission line socket configured in accordance with yet another embodiment of the present invention.

FIG. 10 illustrates a top view of a further embodiment of a transmission line socket 70 in accordance with yet another embodiment of the present invention. Socket 70 is illustrated as a four-site socket with three signal lines 72, however, this is for purposes of example only and the present invention is applicable to a single or multiple-site socket having a plurality of signal lines. Plug-in devices (e.g., Daughter cards 16) may be accepted within any of the slots 74 and the electrical conductors 72 and 76 are arranged so that the plug-in devices are contacted by the conductors on both the front and back sides, thereby reducing the effective signal spacing on the plug-in device and easing associated mechanical tolerance requirements. Electrical conductors 72 and 76 are configured as bus bar transmission lines with solder connections at either end of socket 70.

In this embodiment, the electrical signals within socket 70 are ordered as signal, ground, signal, etc. Such a distribution aids in achieving uniform impedance and minimal crosstalk, however, it is necessary that this same signal distribution pattern be maintained not only between the conductors 72 and 76, but also between contact areas on the plug-in devices. If the electrical contact areas of the conductors 72 and 76 were arranged so as to alternate connections between the front and back sides of a plug-in device, all the signal connections (from conductors 72) would end up on one side of the plug-in device while all the ground connections (form conductors 76) would end up on the other side. This would yield poor electrical qualities because the inductive loop area would be increased, resulting in greater contact inductance.

Figure 11:
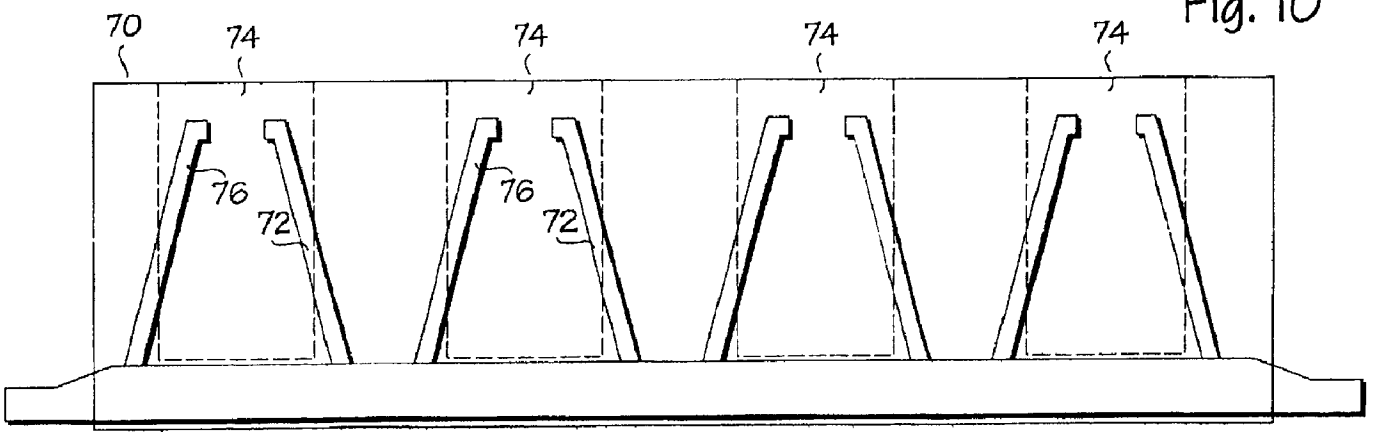
FIG. 11 illustrates a cut-away side-view of the transmission line socket in FIG. 10.

This problem is solved in this embodiment by forming the contact regions of the conductors 72 and 76 so that each row of contacts is bent such that the point where the contact touches the plug-in device is off-set by one-half of the pitch (i.e., the distance between contact regions or pins on the plug-in device). That is, each pair of adjacent signal and ground conductors, 72 and 76, have respective contact regions bent towards one another in a vertical plane. The result is illustrated in FIG. 11 which depicts a cut-away side-view of socket 70, The effect of this forming pattern is that both sides of the plug-in device will contact in a signal, ground, signal, etc. pattern, which maintains good signal isolation and inductance characteristics. The impedance of the transmission line socket 70 may be selected by varying the width, thickness and spacing of the conductors 72 and 76, as well as the ratio of socket body material to air gap spacing separating the conductors.

To provide compliance, contact regions 62a and 62b (and conductors 60a and 60b, if desired) of FIG. 8 and/or conductors 72 and 76 of FIG. 10 may be made from a springy metal such as a Beryllium-Copper (Be—Cu) alloy or another metal. Alternatively, the contact regions may be elastomer-backed metal regions as discussed with reference to FIG. 3. In such a case, the elastomer may be supported by a wall or other region of socket 14. In other embodiments, socket 14 may be a plug (i.e., a non-compliant component of the coupling system) and a compliant coupling region may be provided on Daughter card 14.

Embodiments of the present invention avoid the one-to-one correspondence between the number of contact regions and contact elements which were found in connectors of the past. The one-to-one correspondence of contact regions to contact elements which characterized previous connectors lead to a very high density of contact elements to the substrate (i.e., the printed circuit board). This, in turn, lead to a device which was not readily manufacturable because there was no way to guarantee good connections between the contact elements and the substrate. By avoiding the one-to-one correspondence between contact elements and contact regions, these embodiments of the present invention reduce the density of the connections to the substrate, thereby achieving a more manufacturable device.

In the foregoing specification, the invention has been described with reference to specific exemplary embodiments thereof. It will, however, be evident that various modifications and changes may be made thereto without departing from the broader spirit and scope of the invention as set forth in the appended claims. For example, although RDRAMs® have been referred to in this application, other types of devices are contemplated, including other DRAMs, integrated circuits, memories, circuit boards, and other components requiring an electrical connection to a substrate. The specification and drawings are, accordingly, to be regarded in an illustrative rather than a restrictive sense.

What is claimed is:

1. An electrical connector comprising a plurality of bus conductors, each *bus conductor of the plurality of bus conductors* running through the length of the connector [yet] *and* being electrically isolated from [one another and] *other bus conductors of the plurality of bus conductors, each bus conductor of the plurality of bus conductors* having a number of compliant contact regions [disposed at various positions along their respective lengths so as] to provide electrical coupling points for like contact regions of electrical devices to be received within the connector, the *plurality of* bus conductors [being divided into] *including* first and second groups such that across the width of the connector [a] *each* bus conductor of the first group is positioned [adjacent to] *in an interleaved configuration with each* bus [conductors] *conductor* of the second group [that is positioned adjacent to yet another bus conductor of the first group, and so on for each of the plurality of bus conductors, the] *and having a predetermined* transmission line impedance [of any pair of adjacent bus conductors, one being chosen from the first group and the other being chosen from the second group, being determinable], *and* wherein each of the bus conductors of the first group are adapted to be electrically coupled to respective signal paths associated with a circuit board on which the connector is to be mounted through [only two] *an* electrical contact [elements regardless of the number of compliant contact regions, the two electrical contact elements of each bus conductor of the first group being arranged so that each is] *element* disposed substantially near [an] *each* end of [its] *each* respective bus conductor *of the first group*, and the bus conductors of the second group each being adapted to be electrically coupled to an electrical ground plane associated with the circuit board through a number of electrical contact elements disposed along [their respective lengths, the number of electrical contact elements being irrespective of the number of compliant contact regions] *each bus conductor of the second group*.

2. A connector as in claim 1 wherein a dielectric spacer is disposed between each adjacent bus conductor of the first and second groups.

3. A connector as in claim 2 wherein said compliant contact regions of said bus conductors comprise fingers offset from respective ones of said bus conductors through a bend.

4. A connector as in claim 2 wherein said compliant contact regions comprise elastomer-backed metal regions.

5. A connector as in claim 1 wherein said compliant contact regions of said bus conductors are made of a Beryllium-Copper (Be—Cu) alloy.

6. A connector as in claim 5 further comprising a dielectric spacer disposed between each adjacent bus conductor of the first and second groups.

7. A connector as in claim 1 wherein said compliant contact regions of said bus conductors comprise elastomer-backed metal regions.

8. A connector as in claim 1 wherein the compliant contact regions of bus conductors of the first group are arranged to contact a first side of the electrical devices and the compliant contact regions of bus conductors of the second group are arranged to contact a second side of the electrical devices.

9. A connector as in claim 8 wherein the compliant contact regions of the bus conductors are made of a Beryllium-Copper (Be—Cu) alloy.

10. A connector as in claim 8 wherein the compliant contact regions of the bus conductors comprise elastomer-backed metal regions.

11. A connector as in claim 8 wherein the compliant contact regions of the bus conductors comprise fingers offset from respective ones of the bus conductors through a bend.

12. A connector as in claim 1 wherein the signal paths comprise a plurality of traces on the circuit board.

13. A connector as in claim 12 wherein the compliant contact regions of the bus conductors comprise fingers offset from respective ones of the conductors through a bend.

14. A connector as in claim 12 wherein the compliant contact regions of the bus conductors comprise elastomer-backed metal regions.

15. A connector as in claim 1 wherein said electrical contact elements of said bus conductors of the first group comprise metal posts.

16. A connector as in claim 15 wherein said electrical contact elements of said bus conductors of the second group comprise metal posts.

17. A connector as in claim 16 wherein said metal posts of said bus conductors of the second group are disposed at approximately equal intervals over the lengths of each of said bus conductors of said second group.

*18. A socket for providing an electrical interface between a substrate and a plurality of removable electronic components, the socket comprising:*

*a socket housing adapted to receive the plurality of removable electronic components; and*

*a first group of conductor lines interleaved with a second group of conductor lines, wherein the first group of conductor lines includes a first signal conductor extending through the socket housing and having a predetermined impedance and first and second ends adapted to couple respectively to first and second traces disposed on the substrate such that the first signal conductor forms a signal transmission line between the first and second traces, the first signal conductor further having a plurality of electrical contact regions to couple to counterpart electrical contact regions disposed on the plurality of removable electronic components, and wherein the second group of conductor lines includes a number of electrical contact elements disposed along the length of each conductor line of the second group of conductor lines, the number of electrical contact elements being adapted to couple to a ground plane node of the substrate.*

*19. The socket of claim 18 wherein additional signal conductors of the first group of conductor lines extend*

*through the socket housing parallel to the first signal conductor, the additional signal conductors each having the predetermined impedance and first and second ends adapted to couple to a respective additional pair of traces on the substrate such that each of the additional signal conductors form a signal transmission line between the additional pair of traces, each of the additional signal conductors further having a plurality of electrical contact regions to couple to additional counterpart electrical contact regions disposed on the plurality of removable electronic components, the first signal conductor and the additional signal conductors forming a signaling bus that extends through the socket housing.*

*20. The socket of claim 18 wherein the second group of conductor lines includes a first ground conductor extending through the socket housing and disposed adjacent the first signal conductor, the first ground conductor having a plurality of contact elements disposed along its length to couple the first ground conductor to the ground plane of the substrate.*

*21. The socket of claim 20 wherein the first group of conductor lines include:*

*additional signal conductors extending through the socket housing in a direction parallel to the first signal conductor, the additional signal conductors each having the predetermined impedance and first and second ends adapted to couple to a respective additional pair of traces on the substrate such that each of the additional signal conductors form a signal transmission line between the respective additional pair of traces, each of the additional signal conductors further having a plurality of electrical contact regions to couple respectively to additional counterpart electrical contact regions disposed on the plurality of removable electronic components, the first signal conductor and the additional signal conductors forming a signaling bus that extends through the socket housing;*

*wherein the second group of conductor lines include additional ground conductors extending through the socket housing parallel to the first ground conductor, each of the additional ground conductors having a plurality of contact elements located along its length to couple to a ground plane of the substrate; and*

*wherein signal conductors, including the first signal conductor and the additional signal conductors, and ground conductors, including the first ground conductor and the additional ground conductors, are disposed within the socket housing such that each of the signal conductors is adjacent a respective one of the ground conductors.*

*22. The socket of claim 21 wherein each one of the signal conductors is disposed adjacent another one of the signal conductors.*

*23. The socket of claim 21 wherein the signal conductors and the ground conductors are disposed within the socket housing such that each signal conductor of a subset of the signal conductors is positioned between a respective pair of the ground conductors.*

*24. The socket of claim 21 wherein the signal conductors and ground conductors are disposed within the socket housing such that the contact regions of each signal conductor oppose the contact regions of the adjacent ground conductor.*

*25. The socket of claim 21 wherein each signal conductor and adjacent ground conductor form a signal-ground conductor pair having opposing signal and ground contact regions, each pair of opposing signal and ground contact regions being positioned to contact respective electrical contact elements disposed on opposing faces of a respective one of the removable electronic components.*

*26. The socket of claim 25 wherein the contact regions of the signal conductors of the signal-ground conductor pairs are positioned to alternately contact each of the opposing faces of the respective one of the removable electronic components.*

*27. The socket of claim 26 wherein the contact regions of the ground conductors of the signal-ground conductor pairs are positioned to alternately contact each of the opposing faces of the respective one of the removable electronic components.*

*28. The socket of claim 20 further comprising a dielectric spacer disposed between the first signal conductor and the first ground conductor.*

*29. The socket of claim 28 wherein the width of the dielectric spacer is selected to achieve the predetermined impedance of the first signal conductor.*

*30. The socket of claim 28 wherein the dielectric spacer is bonded to at least one of the first ground conductor and the first signal conductor.*

*31. The socket of claim 20 wherein the first signal conductor and the first ground conductor are formed by respective conductive plates.*

*32. The socket of claim 18 further comprising an elastomer disposed underneath each of the plurality of electrical contact regions of the first signal conductor.*

*33. The socket of claim 18 wherein additional signal conductors of the first group of conductor lines extend through the socket housing parallel to the first signal conductor, the additional signal conductors each having the predetermined impedance and first and second ends adapted to couple to a respective additional pair of traces on the substrate such that each additional signal conductor forms a signal transmission line between the additional pair of traces, each additional signal conductor further having a plurality of electrical contact regions to couple to additional counterpart electrical contact regions on the plurality of removable electronic components; and wherein the socket further comprises a plurality of elastomers extending through the socket housing in a direction transverse to the first signal conductor and the additional signal conductors, each of the elastomers extending beneath at least one electrical contact region of each of the additional signal conductors and beneath at least one electrical contact region of the first signal conductor.*

*34. The socket of claim 33 wherein each of the elastomers of the plurality of elastomers is formed from a dielectric material to maintain electrical isolation between the signal conductors, including the first signal conductor and the additional signal conductors.*

*35. The socket of claim 18 wherein each of the removable electronic components is a daughter card and the socket housing is adapted to receive a plurality of the daughter cards.*

*36. The socket of claim 18 wherein each of the removable electronic components is an integrated circuit device and the socket housing is adapted to receive a plurality of the integrated circuit devices.*

*37. The socket of claim 18 wherein the first and second ends of the first signal conductor include posts adapted to fit into respective holes in the substrate.*

*38. An electrical connector comprising:*

*a connector housing having a plurality of slots to receive removable electronic components;*

*signal conductors that extend through the connector housing to form a signaling bus, the signal conductors*

*including contact regions to electrically couple the removable electronic components to the signaling bus, each of the signal conductors having first and second ends to couple to respective signal traces on a substrate and having a predetermined impedance; and*

*ground conductors that extend through the connector housing parallel to and interleaved with the signal conductors, the ground conductors each including a plurality of contact regions to electrically couple to a ground reference of the substrate, the ground conductors and signal conductors being disposed within the connector housing such that each of the signal conductors is adjacent at least one of the ground conductors.*

*39. The electrical connector of claim 38 wherein a dielectric spacer is positioned between each signaling conductor and adjacent ground conductor.*

*40. The electrical connector of claim 38 wherein each of the signal conductors forms a transmission line between the respective signal traces when coupled thereto.*

*41. The electrical connector of claim 38 wherein each of the signal conductors is adapted to be coupled to the substrate only at the first and second ends, and wherein each of the ground conductors includes at least three contact regions to couple to the ground reference of the substrate.*

*42. The electrical connector of claim 38 wherein the contact regions of the signal conductors and the contact regions of the ground conductors each extend into the slots of the connector housing to contact counterpart contact regions of the removable electronic components when the removable electronic components are inserted into the slots of the connector housing.*

*43. A signaling system comprising:*

*a substrate including a first plurality of signal conducting traces and a second plurality of signal conducting traces;*

*a socket mounted to the substrate and including a housing with slots formed therein, the socket further including a plurality of signal conductors that extend through the housing in a direction transverse to the slots, each signal conductor of the plurality of signal conductors having a predetermined impedance and being coupled to form a transmission line between a respective one of the first plurality of signal conducting traces on the substrate and a respective one of the second plurality of signal conducting traces on the substrate, and wherein the plurality of signal conductors include a group of signaling lines that are interleaved with a group of ground lines, each ground line of the group of ground lines including a plurality of electrical contact elements electrically coupled to a ground plane; and*

*a plurality of electronic components removably inserted into the slots of the socket housing, each of the electronic components including a plurality of contact regions that respectively contact the plurality of signal conductors.*

*44. The signaling system of claim 43 wherein each of the plurality of electronic components comprises a printed circuit board having an integrated circuit device mounted thereon.*

*45. The signaling system of claim 44 wherein the integrated circuit device is a semiconductor memory device.*

*46. The signaling system of claim 45 wherein the semiconductor memory device is a dynamic random access memory device.*

*47. The signaling system of claim 45 further comprising a memory controller mounted to the substrate and coupled to the first plurality of signal conducting traces, the memory controller being adapted to transmit signals to the semiconductor memory device via the first plurality of signal conducting traces.*

*48. The signaling system of claim 43 wherein each of the electronic components comprises an integrated circuit device.*

*49. The signaling system of claim 48 wherein the integrated circuit device is a semiconductor memory device.*

*50. The signaling system of claim 49 wherein the semiconductor memory device is a dynamic random access memory device.*

*51. The signaling system of claim 49 further comprising a memory controller mounted to the substrate and coupled to the first plurality of signal conducting traces, the memory controller being adapted to transmit signals to the semiconductor memory device via the first plurality of signal conducting traces.*

*52. The signaling system of claim 43 further comprising a plurality of termination elements coupled respectively to the second plurality of signal conducting traces.*

*53. The signaling system of claim 43 wherein each ground line of the group of ground lines includes a plurality of contact regions to contact the plurality of electronic components.*

*54. The signaling system of claim 53 wherein each ground line of the group of ground lines is disposed within the housing adjacent at least one of the signaling lines of the group of signaling lines, each ground line of the group of ground lines and each signaling line of the group of signaling lines forming a plurality of signal-ground conductor pairs.*

*55. The signaling system of claim 54 wherein each of the signal-ground conductor pairs contacts a first electrical component of the plurality of electrical components on opposing faces of the first electrical component.*

*56. The signaling system of claim 55 wherein each of the signal-ground conductor pairs are disposed within the socket housing such that the plurality of signal conductors alternately contact a first face and a second face of the opposing faces of the first component.*

*57. The signaling system of claim 56 wherein each of the signal-ground conductor pairs are disposed within the socket housing such that the plurality of ground conductors alternately contact the first face and the second face of the opposing faces of the first component.*

* * * * *